United States Patent [19] [11] 4,404,036
Donegan [45] Sep. 13, 1983

[54] EASILY DISPERSING PHTHALOCYANINE BLUE

[75] Inventor: Thomas E. Donegan, Holland, Mich.

[73] Assignee: BASF Wyandotte Corporation, Wyandotte, Mich.

[21] Appl. No.: 311,335

[22] Filed: Oct. 15, 1981

[51] Int. Cl.$^3$ .................. C04B 31/00; C09C 1/00; C09C 3/00
[52] U.S. Cl. .................. 106/308 M; 106/288 Q; 106/309
[58] Field of Search ............... 106/308 M, 309, 288 Q

[56] References Cited

U.S. PATENT DOCUMENTS

| | | | |
|---|---|---|---|
| 3,712,824 | 1/1973 | Kiyokawa et al. | 106/308 M |
| 3,925,096 | 12/1975 | Karkov | 106/309 |
| 4,055,439 | 10/1977 | Babler et al. | 106/309 X |
| 4,186,124 | 1/1980 | Schimmel et al. | 106/308 M X |
| 4,196,016 | 4/1980 | Simon | 106/309 |
| 4,260,424 | 4/1981 | Mizoguchi et al. | 106/309 |
| 4,267,065 | 5/1981 | Johnson et al. | 106/308 M X |

FOREIGN PATENT DOCUMENTS

| | | | |
|---|---|---|---|
| 254923 | 9/1962 | Australia | 106/309 |
| 649594 | 10/1962 | Canada | 106/309 |
| 2540355 | 3/1976 | Fed. Rep. of Germany | 106/309 |
| 48-61220 | 3/1975 | Japan | 106/308 M |

*Primary Examiner*—John Doll
*Attorney, Agent, or Firm*—Bernhard R. Swick

[57] ABSTRACT

Copper phthalocyanine blue pigments are produced by
(A) grinding,
  1. copper phthalocyanine blue crystals with
  2. an inorganic salt and digesting the ground copper phthalocyanine blue in
     water containing
     a strong mineral acid.
(B) separately preparing an emulsion by dissolving
  1. a resin in
  2. an organic solvent,
  3. an emulsifying agent and
  4. water
(C) mixing
  1. the emulsified resin with
  2. the digested ground copper phthalocyanine pigment and
(D) separating the pigment from the other materials.

12 Claims, No Drawings

EASILY DISPERSING PHTHALOCYANINE BLUE

BACKGROUND OF THE INVENTION

1. Field of the Invention

The present invention relates to a process for preparing copper phthalocyanine blue pigments characterized by good dispersing properties.

2. Prior Art

The introduction of phthalocyanine pigments in 1935 set new standards of excellence in the pigment consuming industries. They are characterized by their excellent light fastness, intensity, bleed and chemical resistance, extreme stability, and exceptionally high tinting strength. Phthalocyanine pigments are restricted to the blue and green regions of the spectrum. Because of their excellent color values, working properties and low cost in addition to durability, phthalocyanine blue and green pigments are used extensively.

It is desirable in the production of phthalocyanine blue to develop a product which will attain approximately 90 percent of its maximum strength by dispersing the dry powder in the vehicle using a high speed agitator. To accomplish this goal, it is necessary to find some means of protecting the particles when the aqueous cake is dried, thus reducing sintering and the formation of aggregates. This can be achieved by extending the product while in the aqueous phase with a suitable resin. Further, resinated pigments are generally softer in texture and disperse more readily in oil-ink applications, when compared to unresinated pigment. However, phthalocyanines must undergo some form of particle size reduction either by acid pasting or salt grinding. Resinating a phthalocyanine is complicated by the presence of strong acid and/or large amounts of salt, making it necessary to filter and wash out the excess salt or acid and reslurry the aqueous cake for resination which adds a great deal to the manufacturing cost of any product. Accordingly, it is a purpose of the instant invention to avoid the need for reslurrying.

STATEMENT OF RELEVANT PATENTS

To the best of applicant's knowledge, the following patents are the ones most relevant to a determination of patentability.

| Pat. No. | Issued | Inventor(s) | Assignee |
|---|---|---|---|
| 4,196,016 | 4/1/80 | Simon | — |
| 3,712,824 | 1/23/73 | Kiyokawa et al | Sakata Shokai Co. |
| 4,055,439 | 10/25/77 | Babler et al | Ciba-Geigy |
| 3,770,474 | 11/6/73 | Langley et al | Ciba-Geigy |

SUMMARY OF THE INVENTION

In accordance with the instant invention, an easily dispersible resinated copper phthalocyanine blue pigment is produced without reslurrying. These copper phthalocyanine blue pigments are produced by (A) grinding,
  1. copper phthalocyanine blue crystals with
  2. an inorganic salt and digesting the ground copper phthalocyanine blue in water containing a strong mineral acid.
(B) separately preparing an emulsion by dissolving
  1. a resin in
  2. an organic solvent,
  3. an emulsifying agent and
  4. water
(C) mixing
  1. the emulsified resin with
  2. the digested ground copper phthalocyanine pigment and
(D) separating the pigment from the other materials.

DESCRIPTION OF THE PREFERRED EMBODIMENT

Copper phthalocyanine blue is a well-known pigment product that has been produced at least since 1935 and there are many well-known processes for producing it. The two processes most generally employed are (1) heating phthalic anhydride, urea, a copper salt and a catalyst with or without a reaction medium such as chloronaphthalene or trichlorobenzene to 180° to 200° C. and (2) heating phthalonitrile and a copper salt with or without a reaction medium or solid diluent. The product that results is generally copper phthalocyanine blue pigment in the beta form and such products are generally purified by methods well known to those skilled in the art. In general, the purification processes involve boiling the crude copper phthalocyanine blue in a 10 percent aqueous acid solution preferably $H_2SO_4$, or 2.5 percent caustic solution, filtering, and washing with hot water at about 85° C. This results in a product that is about 95 percent pure which is a commercially pure product.

In accordance with the instant invention, the purified crude copper phthalocyanine blue is ground in a suitable apparatus such as a double arm mixer for about 5 to 15 hours with an inorganic salt and a monomeric alcohol containing up to 2 hydroxyl groups. Alternately the purified crude copper phthalocyanine blue may be milled in a ball mill for about 12 to 24 hours with an inorganic salt and a recrystallizing solvent. Milling may take place in a conventional ball mill such as one of steel which is approximately one-half full by volume with, for example, one inch by one inch steel rods. The mill should be rotated at about 70 percent of its critical speed (i.e., the speed at which the rods start rotating with the mill). It is necessary that a cascading action take place. Grinding times may exceed those set forth above by substantial amounts without any detrimental effects. However, obviously for economic reasons, it is undesirable to grind for any greater length of time than necessary. As used herein the terms "grind" or "grinding" include both "grinding" and "milling".

In the preparation of copper phthalocyanine blue pigment, it is generally preferred to grind or mill the material to from about 0.02 to 0.05 microns. The grinding or milling operation is conducted at ambient pressure and while there is some exothermic heating, no attempt is made to control the temperature.

In salt grinding in a double arm mixer the preferred inorganic salt is sodium chloride or sodium sulfate.

The monomeric alcohols which may be employed include glycols, particularly ethylene glycol, propylene glycol and diethylene glycol. Methanol or ethanol may also be used. The weight ratio of inorganic salt to pigment ranges from about 5:1 to 12:1 while the weight ratio of the alcohol to pigment ranges from about 0.5:1 to 2:1.

Where ball milling is employed, calcium chloride, sodium chloride, or hydrated aluminum sulfate are preferred in the presence of a crystallizing solvent which is a hydrocarbon or chlorinated hydrocarbon such as 1,1,1-trichloroethane.

Next the phthalocyanine material is digested by adding it to a vessel of water containing a strong mineral acid, preferably HCl or $H_2SO_4$. This aqueous solution preferably contains about 1 to 15 percent by weight of the mineral acid. The weight ratio of aqueous mineral acid solution to pigment is about 27:1 to 44:1. The pigment is added to the dilute acid with stirring at a temperature of about 75° to 100° C. and stirring continued for from about one-half to 6 hours. The digested pigment is then cooled to from about 40° to 60° C. Time is not critical in this matter but generally it should be cooled as fast as practical using the means available. Obviously, refrigeration would cool it the most rapidly but also there would be an expense involved in refrigeration. The costs of a slower cooling process versus the cost of refrigeration would obviously have to be optimized. However, the temperature must be reduced to not more than 60° C. If the temperature exceeds 60° C., foaming becomes a problem.

In a separate container, an emulsion is prepared by dissolving a resin in an organic solvent, adding an emulsifying agent and mixing with water. The resin employed may be either a natural resin such as rosin, copal, dammar and shellac or processed natural resins such as polymerized rosin, rosin esterified with aliphatic monohydric or polyhydric alcohols and/or monohydric or polyhydric phenols. Synthetic resins may be employed such as maleic acid resins, phenol resins, urea resins, melamine resins, aldehyde resins, ketone resins, polyester resins, acrylate resins, polyvinylacetate resins, polystyrene resins, polyisobutylene, cellulose esters, cellulose ethers, rubber derivatives, polyamides, epoxide resins and silicone resins.

Suitable organic solvents include any solvent capable of dissolving the resin such as benzol, toluol, carbon tetrachloride, ethyl acetate, diethyl ether, methylisobutyl ketone, and the like. A preferred solvent is 1,1,1-trichloroethane.

The resin is added to the solvent and stirred until dissolved. The amount of resin is about 5 to 10 percent by weight based on the pigment yield. The amount of solvent is not critical, a preferred amount being about 30 to 70 percent by weight based on the pigment yield. An emulsifying agent, preferably a sulfonated aliphatic polyester, is added to the resin-solvent mixture in order to facilitate emulsification of the resin with the solvent. Conventional surfactants may be employed for this purpose such as those listed below. The amount of emulsifying agent is by weight about 0.5 to 30 percent based on the pigment yield. The preparation of the resin-solvent emulsion is generally performed by mixing the above components with water at ambient temperature and pressure.

In a most preferred embodiment of the instant invention, the resin-solvent-emulsifying agent solution is added to a water solution of a surfactant containing about 0.5 to 5.0 percent by weight surfactant. The weight ratio of the resin-solvent-emulsifying agent solution to surfactant solution is about 0.1:1 to 1.1.

The surfactant can be any anionic, cationic or nonionic surfactant which modifies the properties of a liquid medium at a surface or interface usually by reducing surface tension or interfacial tension. Anionic surfactants include the alkyl aryl sulfonates and lauryl alcohol sulfates. Typical anionic surfactants include sodium oleate, sodium laurate, sodium palmitate, sodium stearate, sodium naphthanate, sulfonated castor oil, sulfonated petroleum, sulfonated tall oil and the like. A particularly preferred anionic is sodium lauryl sulfate.

The cationic surfactants which are suitable include primary, secondary or tertiary amines and the quaternization products derived therefrom. The preferred primary amines are fatty acid or mixed fatty acid amines containing 6 to 18 carbon atoms, and particularly cocoamine. Secondary and tertiary amines and quarternary ammonium compounds from fatty amines containing from 8 to 22 carbon atoms are particularly useful. Typical of the tertiary amines are the heterocyclic tertiary amines such as the alkylimidazolines and oxazolines which form water-soluble salts with various acids and polyethoxylated amines containing a fatty acid radical containing 12 to 22 carbon atoms. Specific examples of quaternary ammonium compounds include disoya dimethylammonium chloride, dicocodimethylammonium chloride, oxtadecyl octadecenyl diethyl ammonium chloride and the like.

A wide variety of nonionic surfactants are known and suitable. Particularly useful are the polyether alcohols such as cogeneric mixtures of conjugated polyoxyalkylene compounds containing in particular oxypropylene and oxyethylene groups. Such products are sold as Pluronic ® Polyols by BASF Wyandotte Corporation. Such surface active agents are more particularly described in U.S. Pat. No. 2,677,700 and U.S. Pat. No. 2,674,619. Also useful are alkylene oxide-alkylene diamine block polymers, the polyoxyethylene glycol or polyoxyethylene glycerol esters of such acids as coconut fatty acid, stearic acid, oleic acid, and rosin/fatty acid combinations, monoesters of polyhydric alcohols and particularly the fatty acid esters such as lauric ester, sorbitol and the like.

The digested ground copper phthalocyanine pigment is then mixed with the emulsified resin generally for about 10 minutes. The mixture is then heated and maintained at the elevated temperature preferably for more than about 1 hour. There is no known maximum time period but for economic reasons the time generally would not exceed 2 hours. The temperature preferably would not exceed 75° C. and generally would be at least about 70° C. Preferably, the solvent is removed by azeotropic distillation. The pigment is then removed by filtration after which it is washed, generally with water, until it is acid and salt free. It is then micromilled to a powder.

For a more complete understanding of the invention, reference is made to the following illustrative example thereof. All parts and percentages are by weight and all temperatures are in degrees Centigrade unless otherwise indicated.

EXAMPLE 1

156 grams of crude caustic purified copper phthalocyanine blue of at least 92 percent purity were charged to a dough mixer along with 1372 grams of sodium chloride and 247 grams of ethylene glycol and the mass mixed 8 hours at 75° to 85° C.

1200 grams of the ground phthalocyanine blue-salt mixture was then stirred into 2688 milliliters of water containing 216 milliliters of concentrated sulfuric acid (98 percent $H_2SO_4$) and stirred for 2 hours at 90° C. The pigment slurry was then cooled to 60° C. by stirring in a container surrounded by air at ambient temperature.

In a separate container, an emulsion was prepared by dissolving 4.5 grams of rosin in 21.6 grams of 1,1,1-trichloroethane. To this was added 0.85 grams of a sulfonated aliphatic polyester sold under the trademark NEKAL WS-25 by GAF Corporation. This rosin-solvent-emulsifier mixture was slowly poured into 150 milliliters of water containing 3.2 grams of sodium lauryl sulfate with vigorous agitation.

The emulsion was then added to the digested pigment slurry over a 10 minute period at 60° C. Next, the mixture was heated with steam through a sparger to 75° C. and maintained at that temperature for 1 hour. The solvent was then removed by azeotropic distillation after which the pigment was isolated by filtration and washed acid free and free of salts. After drying at 75° C., the product was reduced to a powder by micromilling.

The product developed 90 percent of maximum strength by stirring into oil-ink vehicles compared to 70 percent of maximum strength for a similar product wherein the resin-solvent emulsion was omitted. When the inks are compared for grit elimination on a NPIRI grind gauge, the treated product is significantly better for both coarse and fine grit.

EXAMPLE 2

An easily despersible copper phthalocyanine blue pigment is prepared as described in Example 1 with the exception that the grinding step is performed in a ball mill with sodium chloride and 1,1,1-trichloroethane.

Having thus described the invention, what is claimed is:

1. A process for producing an easily dispersible copper phthalocyanine blue pigment comprising:
   (A) grinding
      1. copper phthalocyanine blue crystals with
      2. an inorganic salt and digesting the ground copper phthalocyanine blue in
         water containing
         a strong mineral acid,
   (B) separately preparing an emulsion by dissolving
      1. a resin in
      2. an organic solvent,
      3. an emulsifying agent and
      4. water
   (C) mixing
      1. said emulsified resin with
      2. said digested ground copper phthalocyanine pigment and
   (D) separating the pigment from the other materials.

2. The process of claim 1 wherein said emulsion (B) is prepared by dissolving
   1. a resin in
   2. an organic solvent
   3. adding an emulsifying agent and
   4. pouring into water containing a surfactant.

3. The process of claim 2 wherein said grinding step comprises
   (A) grinding in a mixer
      1. copper phthalocyanine blue crystals with
      2. an organic salt and
      3. a monomeric alcohol containing up to 2 hydroxyl groups and
      digesting the ground copper phthalocyanine blue in
         water containing
         a strong mineral acid.

4. The process of claim 3 wherein
   (A) in said grinding step
      the weight ratio of inorganic salt to pigment is about 5:1 to 12:1,
      the weight ratio of alcohol to pigment is about 0.5:1 to 2:1, and
      the grinding time is from about 5 to 15 hours,
      said digestion is carried out at a temperature of about 75° to 100° C.
      for a period of about 0.5 to 6 hours followed by cooling to a temperature of about 40° to 60° C., and
   (B) in said emulsion preparation step
      the amount of said resin is from about 5 to 10 percent,
      the amount of solvent in which said resin is dissolved in about 30 to 70 percent and the amount of said emulsifying agent is about 0.5 to 3.0 percent
         based on the weight of the pigment produced and
      the amount of said surfactant in said water is about 0.5 to 5.0 percent by weight and
      the weight ratio of resin-solvent-emulsifying agent solution to surfactant solution (B-4) is about 0.1:1 to 1:1.

5. The process of claim 4 wherein
   said inorganic salt is selected from the group consisting of:
      sodium chloride and sodium sulfate
   said monomeric alcohol is selected from the group consisting of
      ethylene glycol, propylene glycol, diethylene glycol, methanol and ethanol,
   said strong mineral acid is
      hydrochloric acid or sulfuric acid,
   said resin is selected from the group consisting of rosin, copal, dammar, shellac, polymerized rosin, rosin esterified with aliphatic monohydric or polyhydric alcohols and/or monohydric or polyhydric phenols, synthetic resins such as maleic acid resins, phenol resins, urea resins, melamine resins, aldehyde resins, ketone resins, polyester resins, acrylate resins, polyvinyl acetate resins, polystyrene resins, polyisobutylene, cellulose esters, cellulose ethers, rubber derivatives, polyamides, epoxide resins and silicone resins,
   said organic solvent is selected from the group consisting of
      1,1,1-trichloroethane, benzol, toluol, carbon tetrachloride, ethylacetate, diethyl ether, and methyl isobutyl ketone, and
   said emulsifying agent and said surfactants are selected from the group consisting of
      anionic, cationic and nonionic surfactants.

6. The process of claim 4 wherein said inorganic salt is sodium chloride, said alcohol is ethylene glycol, said mineral acid is sulfuric acid, said resin is rosin, said solvent is 1,1,1-trichloroethane said emulsifying agent is a sulfonated aliphatic polyester and said surfactant in said water surfactant mixture is sodium lauryl sulfate.

7. The process of claim 6 wherein said separation of the pigment from the other materials is by azeotropic distillation followed by filtration, washing until substantially acid and salt free, and said separation is followed by micromilling said pigment to a dry powder.

8. The process of claim 2 wherein said grinding step comprises
   (A) milling in a ball mill
      1. copper phthalocyanine blue crystals with
      2. an inorganic salt and 3. a crystallizing solvent and digesting the ground copper phthalocyanine blue in water containing a strong mineral acid.

9. The process of claim 3 wherein
(A) in said grinding step
the grinding time is from about 12 to 24 hours,
said digestion step is carried out at a temperature of from about 75° to 100° C. for a period of from about 0.5 to 6 hours followed by
cooling to a temperature of about 40° to 60° C., and
(B) in said emulsion preparation step
the amount of said resin is from about 5 to 10 percent,
the amount of solvent in which said resin is dissolved is about 30 to 70 percent and the amount of said emulsifying agent is about 0.5 to 3.0 percent,
based on the weight of the pigment produced and
the concentration of said surfactant in said water solution is about 0.5 to 5.0 percent by weight, and
the weight ratio of resin-solvent-emulsifying agent to said water solution of surfactant (B-4) is about 0.1:1 to 1:1.

10. The process of claim 9 wherein
said inorganic salt is selected from the group consisting of:
calcium chloride, sodium chloride and hydrated aluminum sulfate
said crystallizing solvent is selected from the group consisting of:
hydrocarbons and chlorinated hydrocarbons
said strong mineral acid is
hydrochloric acid or sulfuric acid,
said resin is selected from the group consisting of rosin, copal, dammar, shellac, polymerized rosin, rosin esterified with aliphatic monohydric or polyhyric alcohols and/or monohydric or polyhydric phenols, calcium, zinc or magnesium salts of rosin, synthetic resins such as maleic acid resins, phenol resins, urea resins, melamine resins, aldehyde resins, ketone resins, polyester resins, acrylate resins, polyvinyl acetate resins, polystyrene resins, polyisobutylene, cellulose esters, cellulose ethers, rubber derivatives, polyamides, epoxide resins and silicone resins,
said organic solvent is selected from the group consisting of:
1,1,1-trichloroethane, benzol, toluol, carbon tetrachloride, ethylacetate, diethyl ether, and methyl isobutyl ketone, and
said emulsifying agent and said surfactant are selected from the group consisting of
anionic, cationic and nonionic surfactants.

11. The process of claim 9 wherein said inorganic salt is sodium chloride, said crystallizing solvent is 1,1,1-trichloroethane said mineral acid is sulfuric acid, said resin is rosin, said solvent is 1,1,1-trichloroethane, said emulsifying agent is a sulfonated aliphatic polyester and said surfactant in said surfactant-water mixture is sodium lauryl sulfate.

12. The process of claim 11 wherein said separation of the pigment from the other materials is by azeotropic distillation followed by filtration, washing until substantially acid and salt free, and said separation is followed by micromilling said pigment to a dry powder.

* * * * *